(12) United States Patent
Rowe et al.

(10) Patent No.: US 8,401,307 B1
(45) Date of Patent: Mar. 19, 2013

(54) DETERMINING CELESTIAL COORDINATES FOR AN IMAGE

(75) Inventors: David Rowe, Redondo Beach, CA (US); Danyal Medley, Lakewood, CA (US)

(73) Assignee: Celestron, LLC, Torrance, CA (US)

( * ) Notice: Subject to any disclaimer, the term of this patent is extended or adjusted under 35 U.S.C. 154(b) by 197 days.

(21) Appl. No.: 12/983,065

(22) Filed: Dec. 31, 2010

(51) Int. Cl.
    *G06K 9/32* (2006.01)
(52) U.S. Cl. ........ 382/201; 382/103; 382/181; 382/190; 382/195; 382/291; 348/169; 359/399; 359/429; 359/430; 701/500; 701/513; 250/200; 250/201.3; 250/203.3; 250/203.4; 250/203.6
(58) Field of Classification Search .................. None
    See application file for complete search history.

(56) References Cited

U.S. PATENT DOCUMENTS

| | | |
|---|---|---|
| D268,786 S | 4/1983 | Galindo |
| 5,223,702 A | 6/1993 | Conley |
| 5,243,351 A | 9/1993 | Rafanelli et al. |
| 5,335,190 A | 8/1994 | Nagle et al. |
| 5,525,793 A | 6/1996 | Holmes et al. |
| D390,583 S | 2/1998 | Diebel et al. |
| D392,657 S | 3/1998 | Diebel et al. |
| 5,745,869 A | 4/1998 | van Bezooijen |
| D412,920 S | 8/1999 | Diebel et al. |
| 5,935,195 A | 8/1999 | Quine |
| D417,680 S | 12/1999 | Diebel et al. |
| D417,881 S | 12/1999 | Diebel et al. |
| D422,610 S | 4/2000 | Diebel et al. |
| 6,266,616 B1 | 7/2001 | Needelman |
| 6,304,376 B1 | 10/2001 | Baun et al. |
| 6,369,942 B1 | 4/2002 | Hedrick et al. |
| 6,392,799 B1 | 5/2002 | Baun et al. |
| 6,445,498 B1 | 9/2002 | Baun et al. |
| 6,563,636 B1 | 5/2003 | Baun et al. |

(Continued)

FOREIGN PATENT DOCUMENTS

| | | |
|---|---|---|
| EP | 0785453 | 10/2001 |
| WO | 2004049033 | 6/2004 |

(Continued)

OTHER PUBLICATIONS

Carpenter et al. "Searching the Sky with Configr-Stars", 2010, Technical Report CAS/CNS TR-2009-013, Neural Networks, pp. 1-23.*

(Continued)

*Primary Examiner* — Matthew Bella
*Assistant Examiner* — Jason Heidemann
(74) *Attorney, Agent, or Firm* — Raubvogel Law Office

(57) ABSTRACT

A plate solving methodology determines celestial coordinates of an image. Star locations are extracted from the image in terms of pixel coordinates. A group of four stars, referred to as a "test quad", is identified. A signature for the test quad is generated. In one embodiment, this test signature is derived by determining the separations of the four stars in the test quad, normalized by the largest separation. In one embodiment, the signature also includes the sum of these normalized separations. A query is performed, using the generated signature, against a database of reference signatures for known groups of stars (referred to as "reference quads"). A geometric transform is determined, establishing the relationship between the test quad and a reference quad that matches within a specified tolerance. This geometric transform defines the celestial coordinates of the image. Additional verification steps can be performed to confirm the accuracy of the match.

35 Claims, 13 Drawing Sheets

U.S. PATENT DOCUMENTS

| | | | |
|---|---|---|---|
| D492,334 | S | 6/2004 | Hines et al. |
| D496,672 | S | 9/2004 | Hines et al. |
| D496,673 | S | 9/2004 | Hines et al. |
| D502,201 | S | 2/2005 | Hines et al. |
| D502,481 | S | 3/2005 | Hines et al. |
| 6,972,902 | B1 | 12/2005 | Chen et al. |
| 7,046,438 | B2 | 5/2006 | McWilliams |
| 7,194,146 | B2 | 3/2007 | BenDaniel et al. |
| 7,313,763 | B1 | 12/2007 | Bisque et al. |
| 7,339,731 | B2 | 3/2008 | Baun et al. |
| 7,349,804 | B2 | 3/2008 | Belenkii et al. |
| 7,382,448 | B1 | 6/2008 | Hedrick et al. |
| 7,526,100 | B1 | 4/2009 | Hartman et al. |
| 2003/0086150 | A1 | 5/2003 | Moon et al. |
| 2003/0156324 | A1 | 8/2003 | Baun et al. |
| 2003/0197930 | A1 | 10/2003 | Baun et al. |
| 2003/0202682 | A1* | 10/2003 | Yanagisawa et al. ......... 382/103 |
| 2004/0047036 | A1 | 3/2004 | Baun et al. |
| 2004/0233521 | A1 | 11/2004 | McWilliams |
| 2005/0168811 | A1 | 8/2005 | Mattei |
| 2005/0225854 | A1 | 10/2005 | McWilliams |
| 2006/0001956 | A1 | 1/2006 | Baun et al. |
| 2006/0018012 | A1 | 1/2006 | Smith et al. |
| 2006/0028720 | A1 | 2/2006 | Harrelson |
| 2006/0103926 | A1 | 5/2006 | Meyers et al. |
| 2006/0158722 | A1 | 7/2006 | Fujimoto et al. |
| 2006/0238860 | A1* | 10/2006 | Baun et al. ..................... 359/429 |
| 2006/0284495 | A1* | 12/2006 | Seo et al. ......................... 310/12 |
| 2007/0115545 | A1 | 5/2007 | Chen et al. |
| 2007/0183031 | A1 | 8/2007 | Xu et al. |
| 2008/0018995 | A1 | 1/2008 | Baun |
| 2008/0174863 | A1 | 7/2008 | Whorton |
| 2010/0085638 | A1 | 4/2010 | Lopresti |
| 2010/0103251 | A1* | 4/2010 | Numako ......................... 348/61 |

FOREIGN PATENT DOCUMENTS

| | | |
|---|---|---|
| WO | 2009057163 | 5/2009 |

OTHER PUBLICATIONS

Carpenter, Gail, et al., "Searching the sky with Configr-Stars", Neural Networks, Elsevier Science Publishers, vol. 24, No. 2, Oct. 26, 2010, pp. 208-216.

"Plate Solving, Pointing Correction & Auto Mapping (A laymen's explanation)", Apr. 7, 2009. Retrieved from the Internet: URL:http://www.jatobservatory.org/remote_control/platesolve.html.

A Sky Full of Stars, "Plate Solving", May 16, 2009, pp. 1-6 (retrieved on Mar. 29, 2011 from http://blog.askyfullofstars.com/tag/plate-solving/).

ACP Observatory Control Software (retrieved on Mar. 29, 2011 from http://acp.dc3.com/index2.html).

Bruccoleri, Christian, et al., "Toward Ground-Based Autonomous Telescope Attitude Estimation Using Real Time Star Pattern Recognition", Texas A&M University, 2004, pp. 1-12.

Roweis, Sam, et al., "Making the Sky Searchable: Fast Geometric Hashing for Automated Astrometry", Center for Cosmology and Particle Physics, University of Toronto, pp. 1-49, 2006.

Dong, Ying, et al., "Brightness Independent 4-Star Matching Algorithm for Lost-in-Space 3-Axis Attitude Acquisition", Tsinghua Science and Technology, ISSN 1007-0214 08/18 pp. 543-548, vol. 11, No. 5, Oct. 2006.

Harvey, Chris, "New Algorithms for Automated Astrometry", University of Toronto, 2004, p. 1-93.

Hogg, David W., et al., "Automated Astrometry", Astronomical Data Analysis Software and Systems XVII, ASP Conference Series, vol. 394, 2008, pp. 27-34.

Samaan, Malak A., et al., "Nondimensional Star Identification for Uncalibrated Star Cameras", The Journal of the Astronautical Sciences, vol. 54, No. 1, Jan.-Mar. 2006, pp. 1-17.

Lang, Dustin, et al., "Blind astrometric calibration of arbitrary astronomical images", Astrometry.net, Oct. 12, 2009, pp. 1-55.

Mortari, Daniele, et al., "The Pyramid Star Identification Technique", Texas A&M University, College Station, Texas, pp. 1-21, 2004.

Cole, Gary M., "Automating a Telescope for Spectroscopy", The Society for Astronomical Sciences 27th Annual Symposium on Telescope Science, 2008, pp. 103-108.

Edgar, James, "The Saskatchewan Millennium Telescope", Journal of the Royal Astronomical Society of Canada, Jun. 2002, pp. 91-95.

Gerszewski, Michael T., "The hardware and software design of the asteroid and comet Internet telescope", University of North Dakota, 2002, pp. 1-112.

Kubanek, Petr, "RTS2—The Remote Telescope System", Hindawi Publishing Corporation, Advances in Astronomy, vol. 2010, Jan. 29, 2010, pp. 1-9.

* cited by examiner

DETERMINING CELESTIAL COORDINATES FOR AN IMAGE

CROSS-REFERENCE TO RELATED APPLICATION

This invention is related to U.S. patent application Ser. No. 12/983,085 for "System and Method for Automatically Aligning a Telescope Without Requiring User Intervention", filed on the same date as the present application. The related application is incorporated herein by reference.

FIELD OF THE INVENTION

The present invention relates to interpretation of images of celestial objects, such as for astrometry-related applications, and more particularly to systems and methods for determining celestial coordinates for an image.

DESCRIPTION OF THE RELATED ART

Astrometry is a branch of astronomy that deals with measurement of the position and motion of celestial objects. In astrometry, it is often useful to determine, with precision, the celestial coordinates of an image depicting celestial objects such as stars.

The process of determining celestial coordinates of an image is often referred to as "plate solving", based on historical usage of film plates for astrophotography. Although the term "plate solving" is still in use, it generally refers to images that are generated and stored using any known technology, including digital images captured via charge-coupled device (CCD) sensors or other electronic means. Accordingly, the use of the term "plate solving" is not intended to be limited to methodologies involving actual film plates.

In general, plate solving involves a mathematical transformation that takes star positions from a captured digital image (referred to as a "plate"). These star positions may be expressed as pixel-based coordinates with respect to the digital image, and are therefore referred to as "plate coordinates." Plate coordinates are then translated to celestial coordinates of the depicted celestial objects, expressed for example in terms of right ascension and declination. The celestial coordinates for the digital image (for example in terms of the center of the plate) can thus be calculated.

Many conventional plate solving methods generally require input of some initial contextual information about the image. Such contextual information can include, for example, image scale (derived, for example, from the optical system and imaging hardware used to generate the image) and/or an approximate location of the celestial coordinates for the image's center. Those methodologies that do not require contextual information generally have limited fields of view, exhibit reduced reliability, and/or require a very large database of star information, making them impractical in many applications.

Examples of known astrometric plate solving engines include the PinPoint Astrometric Engine, available from DC-3 Dreams SP of Mesa, Ariz., and CCDSoft's AutoAstrometry feature, available from Software Bisque of Golden, Colo. Each of these plate solving engines requires knowledge of optical configurations of the telescope used to generate the digital image, as well as the approximate pointing position of the telescope. Accordingly, such techniques are generally unable to operate effectively in a contextually independent environment, wherein the plate scale is not known to a significant degree of accuracy, and/or wherein the initial celestial pointing position of the camera at the time of capture is not known.

In general, conventional plate solving techniques do not provide any practical, reliable, and robust method for determining celestial coordinates for an image in the absence of contextual information.

SUMMARY

According to various embodiments of the present invention, a robust plate solving methodology is implemented in such a manner that avoids the need for contextual information about the image. An image-to-celestial coordinate transform is generated and used to determine the celestial coordinates of the plate center, for example in terms of right ascension and declination. The transform can also be used to determine the precise celestial coordinates of any extracted stars from the captured image.

An image (referred to as a "plate") is processed to extract a list of locations of potential stars, in (x,y) pixel coordinates, with respect to an origin point of the image. The list of locations of potential stars is searched to obtain an optimal group of four stars to be used for search purposes; this optimal group of stars is referred to as a "test quad". A signature for the test quad is generated that is independent of the scale of the image. In one embodiment, this test signature is derived by calculating the separations of the four stars in the test quad, normalized by the largest separation. In one embodiment, the signature also includes the sum of these normalized separations.

A query is performed, using the generated signature, against a pregenerated database of reference signatures for known groups of stars (referred to as "reference quads"). In one embodiment, the reference signatures are normalized and strategically sorted. The normalization process assists in narrowing the range of the reference signatures to be searched, thus decreasing the search and processing times.

Each detected match (within a specified tolerance) with a reference signature in the database represents a guess at the location of the sky that may correspond to the image. Using the stars associated with the reference quad corresponding to the matching reference signature, a geometric transformation is generated that aligns these stars to the stars from the test quad. In one embodiment, this transform produces a series of parameters that are used to calculate any or all of the following for the plate:

scale, expressed, for example in pixels to arcseconds;
center of the plate's field in right ascension and declination;
rotation;
skew; and
stretch.

The methodology of the present invention is able to operate without prior knowledge of the optical system and image capture system parameters, and without the need for information such as image scale, orientation, or estimates relating to the image location. In addition, the methodology of the present invention minimizes the size of the database needed for implementation, allowing the invention to be implemented in a wide variety of end-use applications, including those with limited data storage options.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

Figure 1:
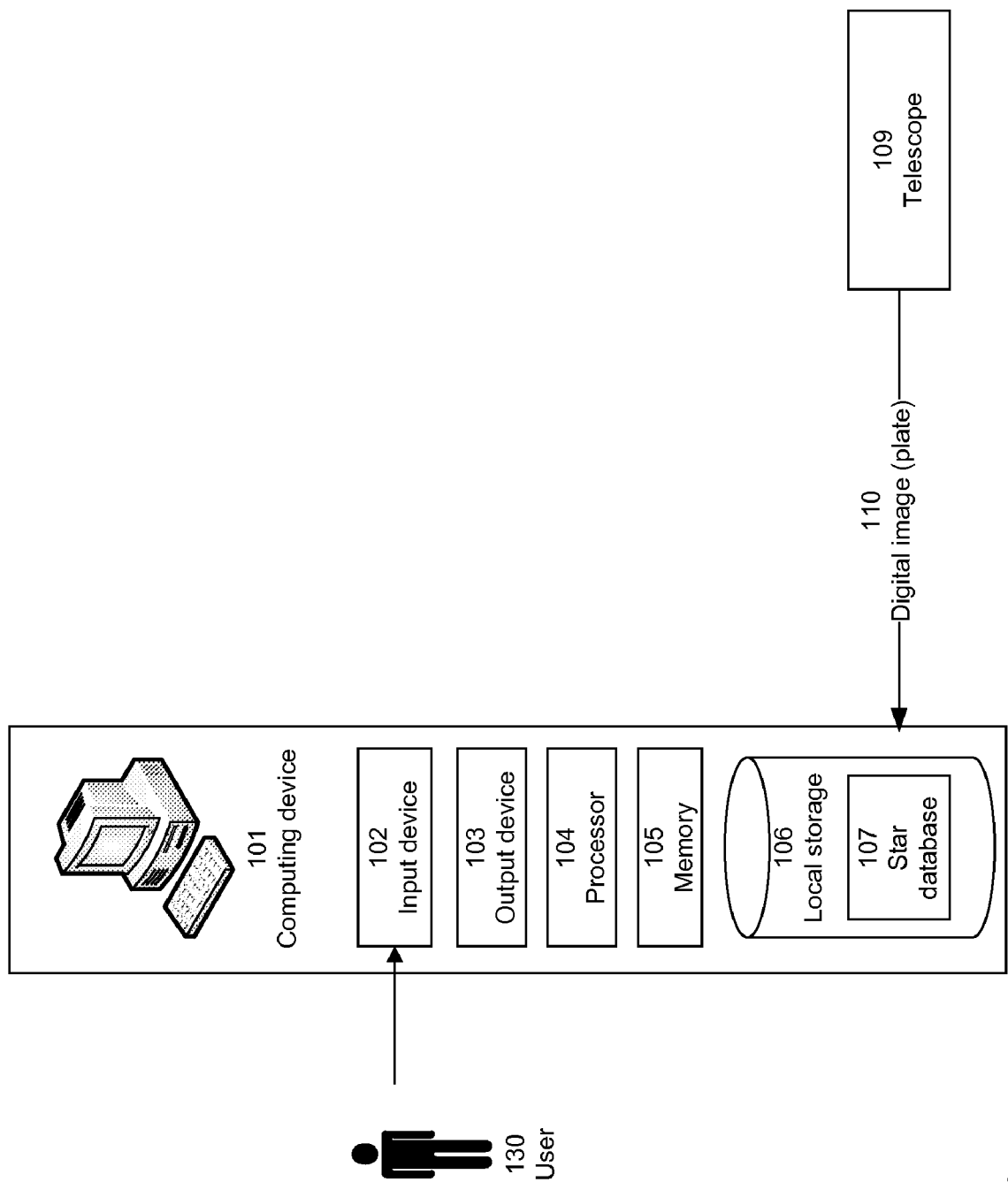
FIG. 1 is a block diagram depicting a hardware architecture for practicing the present invention in a stand-alone computing device according to one embodiment of the present invention.

According to various embodiments, the present invention can be implemented within a telescope or other device for generating or capturing celestial images. According to other embodiments, the present invention can be implemented within a computing device or other electronic device that can be communicatively coupled with a telescope or other imaging device. According to other embodiments, the present invention can be implemented within a computing device or other electronic device for operating on previously captured images that may be provided, for example, in electronic or photographic form.

The invention can be implemented on a stand-alone electronic device, or on a plurality of electronic devices communicatively coupled with one another, such as for example in a client/server environment wherein some components are client-based and other components are server-based. Each such electronic device may be, for example, a personal computer, handheld computer, personal digital assistant (PDA), kiosk, cellular telephone, or the like. An electronic network enabling communication among two or more electronic devices may be implemented using well-known network protocols such as Hypertext Transfer Protocol (HTTP), Secure Hypertext Transfer Protocol (SHTTP), Transmission Control Protocol/Internet Protocol (TCP/IP), and/or the like. Such a network may be, for example, the Internet or an Intranet. For example, the invention can be used to analyze images provided from a local source, such as a telescope or local storage device, and to determine celestial coordinates with respect to star databases located at a server. In such an embodiment, the user may interact with the system via a browser, such as Internet Explorer, available from Microsoft Corporation of Redmond, Wash.; the browser in turn initiates communication with the server to perform the steps of the invention. For example, the user may log onto a website, submit an image from local storage or from a telescope, and may receive, from the server, celestial coordinates for the image. Alternatively, the techniques described herein can be implemented on any other type of computing device, combination of devices, or platform.

Although the invention is described herein in the context of celestial imagery, one skilled in the art will recognize that the techniques of the present invention can be implemented in other contexts, and indeed in any context in which it is desired to determine coordinates of a particular image with respect to a universal, global, or other coordinate system. Accordingly, the following description is intended to illustrate various embodiments of the invention by way of example, rather than to limit the scope of the claimed invention.

In one embodiment, the present invention is implemented as a feature of a telescope or other device for observing celestial objects. In another embodiment, the invention is implemented as a software application running on a computing device, consumer electronic device, telescope, imaging device, or the like. The software application may be a desktop application or a web-based application that is accessible via a browser such as Microsoft Internet Explorer, available from Microsoft Corporation of Redmond, Wash., or by a specialized web-based client application. The invention can operate in connection with live images (i.e., images as they are being captured) or previously captured images. Images can be provided in any form, whether electronic, optical, photographic, or the like. The terms "digital image" and "plate" herein are used herein for ease of nomenclature, and no limitation to particular forms or media is intended or should be implied.

Referring now to FIG. 1, there is shown a block diagram depicting a hardware architecture for practicing the present invention according to one embodiment. Such an architecture can be used, for example, for implementing the techniques of the present invention in connection with a stand-alone software application running on a computer or other computing device communicatively coupled to a telescope 109 or other device for capturing or generating an image. Telescope 109 provides image 110 via any known communications mechanism, whether wired or wireless. Image 110 may be a digital image, photographic image, optical image, or any other type of image; image 110 is variously referred to herein as an "image", "digital image", or "plate", but usage of such various terms should not be considered to limit the scope of the invention to any particular type or format of image.

Computing device 101 may be any electronic device adapted to run software; for example, computing device 101 may be a desktop computer, laptop computer, personal digital assistant, smartphone, music player, handheld computer, tablet computer, kiosk, game system, or the like. Alternatively, computing device 101 can be a component of telescope 109 itself, either bundled with telescope 109 or purchased as an add-on. In one embodiment, computing device 101 is a desktop computer running an operating system such as Microsoft Windows, available from Microsoft Corporation of Redmond, Wash., or a smartphone such as the Apple iPhone, available from Apple Inc. of Cupertino, Calif.

In one embodiment, computing device 101 comprises a number of hardware components as are well known to those skilled in the art. Input device 102 can be a keyboard, mouse, touchscreen, trackball, trackpad, five-way switch, voice input device, joystick, and/or any combination thereof. Output device 103 can be a screen, speaker, printer, and/or any combination thereof. Processor 104 can be a conventional microprocessor for performing operations on data under the direction of software, according to well-known techniques. Memory 105 can be randomaccess memory having a structure and architecture as are known in the art, for use by processor 104 in the course of running software. Local storage 106 can be any magnetic, optical, and/or electrical storage device for storage of data in digital form; examples include flash memory, magnetic hard drive, CD-ROM, and/or the like. In one embodiment, local storage 106 includes star database 107, which includes information describing the positions of celestial objects, for use in connection with the present invention to determine the celestial coordinates of image 110, as described in more detail herein.

One skilled in the art will recognize that the particular arrangement of hardware elements shown in FIG. 1 is merely exemplary, and that invention can be implemented using different hardware elements configured in any of a number of different ways. Thus, the particular architecture shown in FIG. 1 is merely illustrative and is not intended to limit the scope of the invention in any way.

Figure 2:
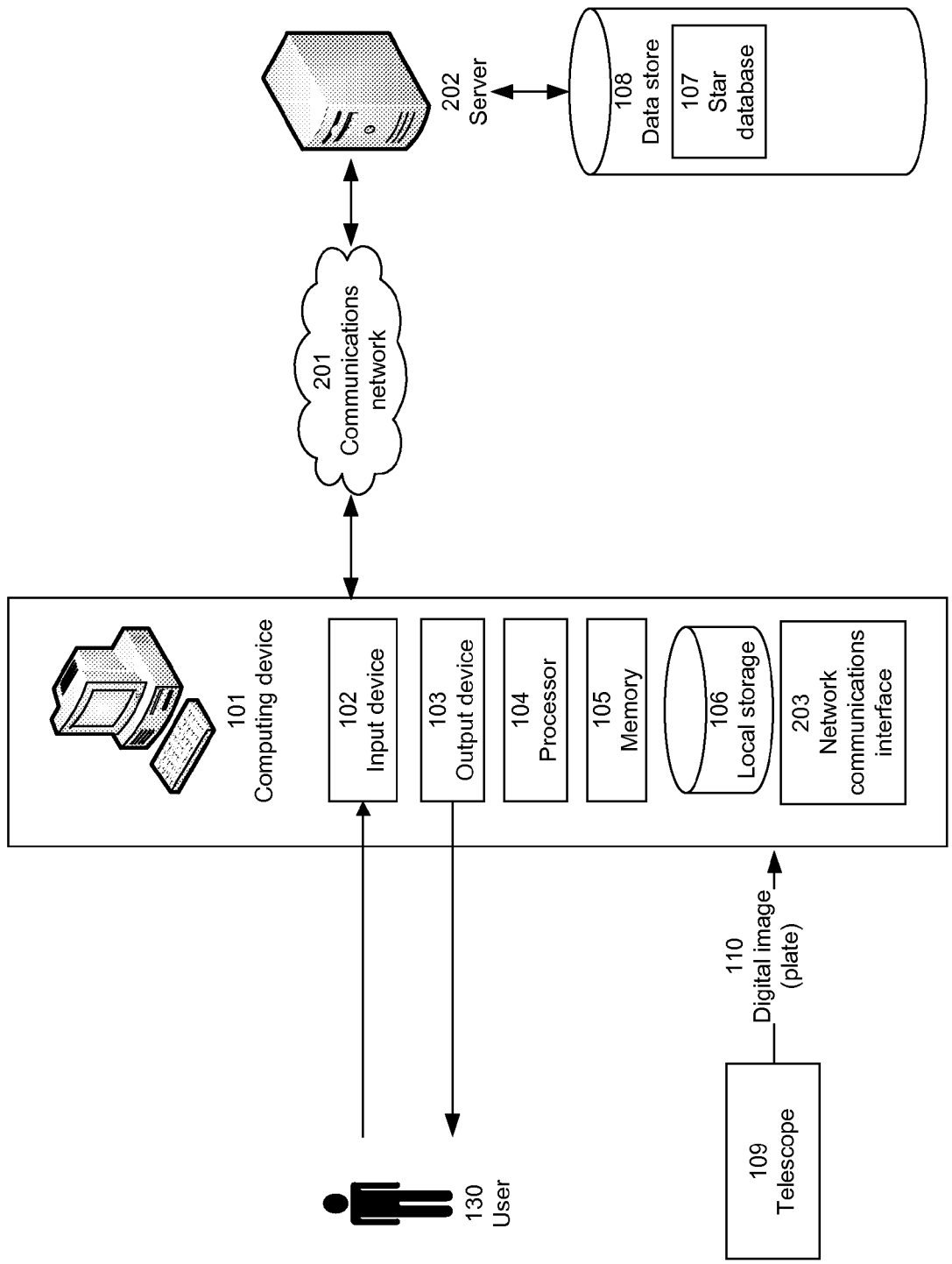
FIG. 2 is a block diagram depicting a hardware architecture for practicing the present invention in a client/server environment according to one embodiment of the present invention.

Referring now to FIG. 2, there is shown a block diagram depicting a hardware architecture for practicing the present invention in a client/server environment according to one embodiment of the present invention. Such an architecture can be used, for example, for implementing the techniques of the present invention in connection with a web-based application or web page. In one such embodiment, processor 104 runs browser software according to well known mechanisms.

Network communications interface 203 is an electronic component that facilitates communication of data to and from other computing devices over communications network 201. Communications network 201 can be the Internet or any other electronic communications network.

Server 202 communicates with computing device 101 over network 201, and in one embodiment can be located remotely or locally with respect to computing device 101. In one embodiment, server 202 is associated with data store 108, which contains star database 107 including information describing the positions of celestial objects, for use in connection with the present invention to determine the celestial coordinates of image 110, as described in more detail herein. Thus, in various embodiments, star database 107 can be located at server 202 or at computing device 101. In one embodiment, star database 107 (or some portion thereof) can be transmitted to computing device 101 as part of a client/server session, to improve responsiveness while user 130 interacts with computing device 101.

One skilled in the art will recognize that the present invention may be implemented using a distributed software architecture if appropriate. One skilled in the art will further recognize that the client/server architecture shown in FIG. 2 is merely exemplary, and that other architectures can be used to implement the present invention, including architectures that are not necessarily web-based. Thus, the particular architecture shown in FIG. 2 is merely illustrative and is not intended to limit the scope of the invention in any way.

Figure 4:
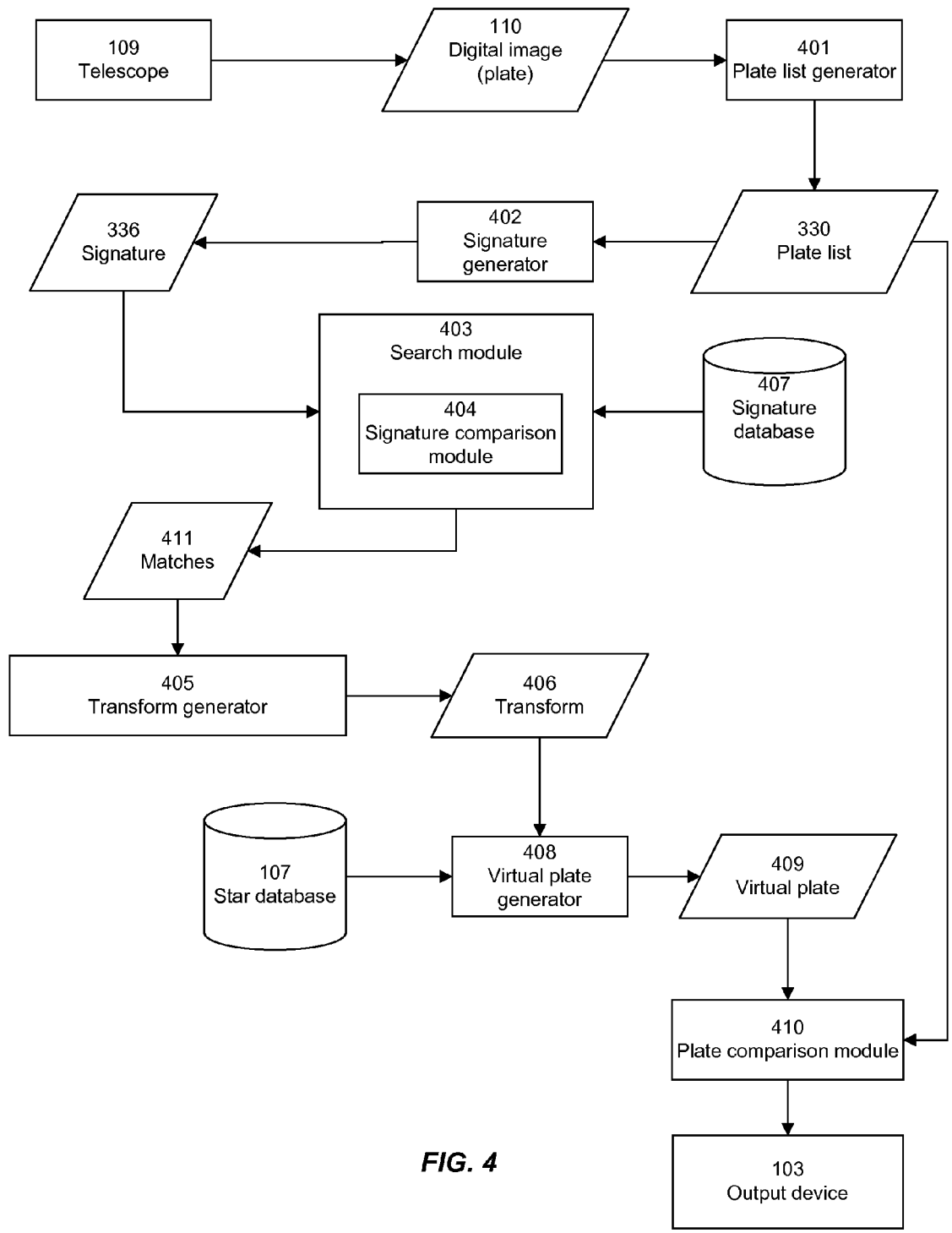
FIG. 4 is a block diagram depicting a conceptual architecture for practicing the present invention according to one embodiment of the present invention.

Referring now to FIG. 4, there is shown a block diagram depicting a conceptual architecture for practicing the present invention according to one embodiment of the present invention. The conceptual architecture of FIG. 4 can be implemented in connection with a hardware architecture as depicted in FIGS. 1 and/or 2, or with any other suitable architecture including an architecture in which the invention is implemented using hardware that an integrated component of telescope 109. The conceptual architecture of FIG. 4 includes several components that can be implemented as software modules running on processor 104 or on any other suitable component. Such software modules may be implemented as parts of a single software application, or they can be provided separately as distinct software components, running on a common processor or on any number of distinct processors. Any or all of such software modules may be implemented in a client component, server component, or any combination thereof. One skilled in the art will recognize that the software modules may be combined or divided in any suitable manner, and that the particular names, functions, and communication paths indicated herein for these modules are selected merely for ease of nomenclature and description, and are not intended to restrict or limit the scope of the claimed invention in any way. In other embodiments, the components of FIG. 4 can be implemented in firmware or hardware, and need not be implemented as software modules.

As depicted in FIG. 4, in one embodiment, the system of the present invention includes, for example, any or all of the following:

- plate list generator 401, which extracts positions of celestial objects, such as stars, from plate 110, to generate plate list 330;
- signature generator 402, which generates test signature 336 from plate list 330;
- signature database 407, which includes generated reference signatures, which in one embodiment comprise normalized parameters for groups of four stars (in one embodiment, signatures are indexed to a star database 107 for easy of identification; in another embodiment, signature database 407 can be part of star database 107, linked to star database 407, or otherwise associated with star database 107);
- search module 403, which searches through signature database 407 to find matches 411 among reference signatures, using signature comparison module 404 to compare test signature 336 against reference signatures 336 from database 407;
- transform generator 405, for generating a transform 406 specifying a relationship between a test signature 336 and a matching reference signature 336;
- virtual plate generator 408, and plate comparison module 410, for verifying that the matching signature is a correct match.

Databases 407 and 107 may or may not be optimized for a given range of magnitudes and image scales that may be encountered in plates 110; however such optimization is not necessary to practice the present invention. The relative comprehensiveness and level of inclusion of databases 407 and 107 can be adjusted based on various factors, such as size and resource limitations, processing time required to perform signature matching, and the like.

Operation of these various components and modules is described in more detail below.

Relationships of Plates 110 to Celestial Positions

According to various embodiments, the system and method of the present invention attempt to match signatures, representing groups of stars found in plates 110, to stored reference signatures representing a catalogue of known celestial objects such as stars. In one embodiment, signatures are generated based on positions of groups of four stars, referred to herein as "quads", although one skilled in the art will recognize that groups of any number of stars can be used, and that the invention is not limited to exactly four stars.

Figure 6A:
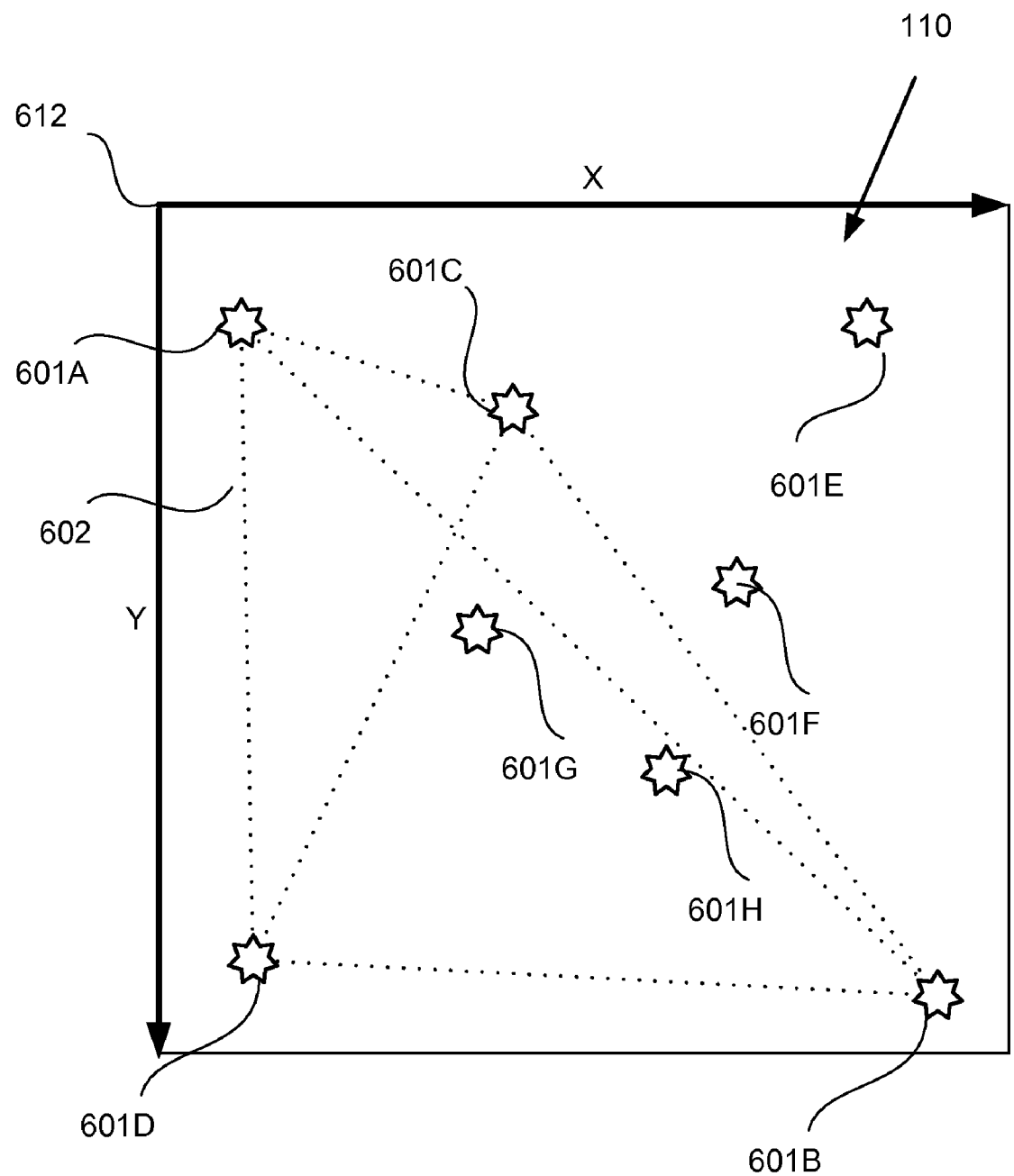
FIG. 6A depicts an example of a plate, including a test quad, expressed in (x,y) pixel coordinates, according to one embodiment.
Figure 6B:
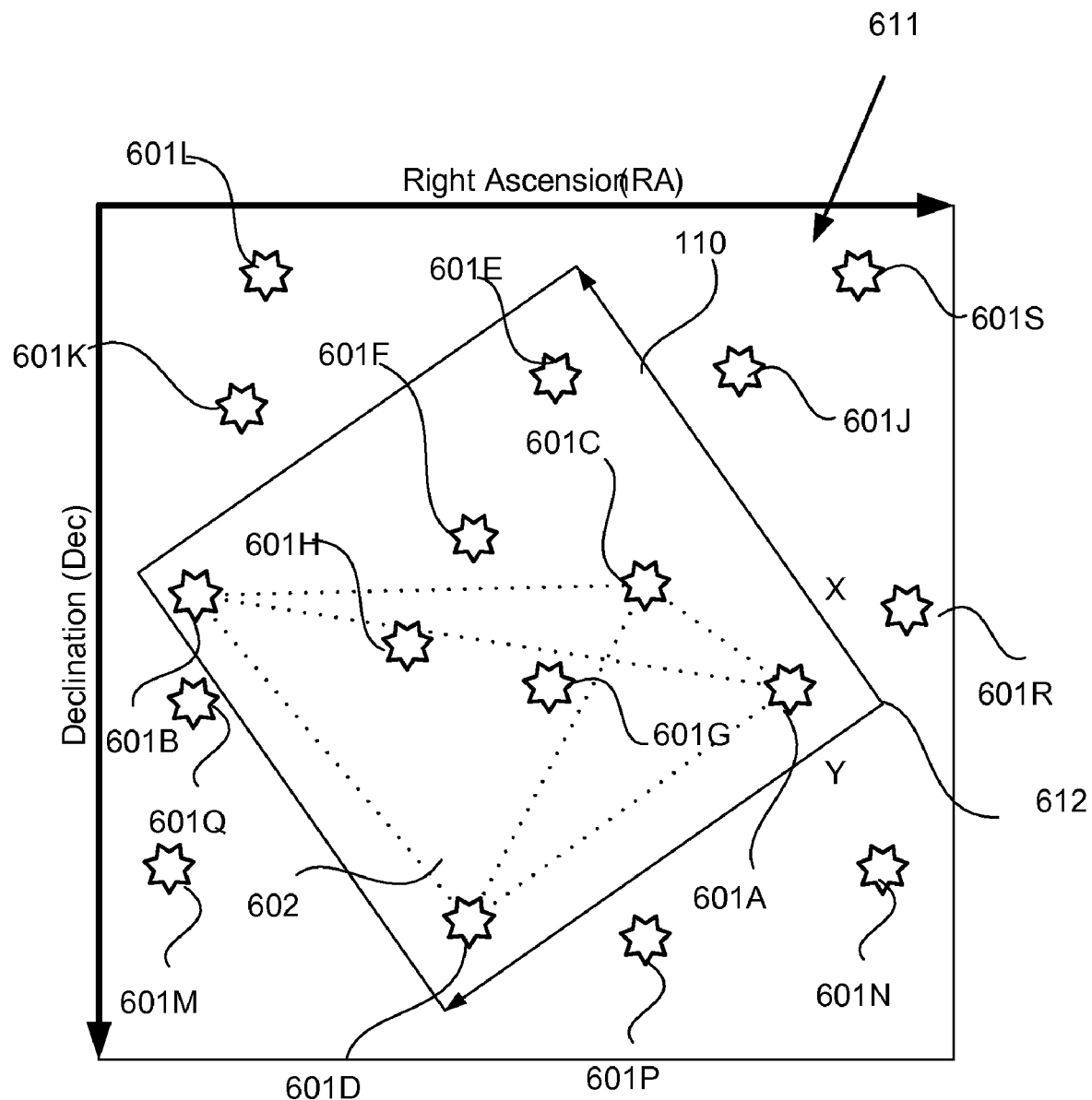
FIG. 6B depicts a representation of the plate of FIG. 6A, shown in the context of a virtual star field expressed in celestial right ascension and declination units, according to one embodiment.

FIGS. 6A and 6B illustrate the relationship between plate 110 and data in signature database 407 and/or star database 107. Referring now to FIG. 6A, there is shown an example of a plate 110, including a test quad 602 including four stars 601A-601D, wherein the positions of stars 601A-601D are expressed in (x,y) pixel coordinates in with reference to x and y axes, and with respect to an origin point 612, according to one embodiment. Plate 110 can represent, for example, a field of stars captured by telescope 109 and reduced to (x,y) pixel coordinates.

Referring now also to FIG. 6B, there is shown a representation of plate 110 of FIG. 6A, shown in the context of virtual star field 611 expressed in celestial right ascension and declination coordinates, according to one embodiment. Virtual star field 611 can be taken, for example, from star database 107, which represents a catalogue of star information including celestial right ascension and declination coordinates for celestial objects. As can be seen in FIGS. 6A and 6B, the same pattern of stars 601A-601D is present, but a transformation has taken place, so that the star positions are changed. In addition, FIG. 6B also includes stars 601E-601H that are not part of quad 602, and other stars 601J-601S that do not appear in plate 110.

The relationship of the star arrangements depicted in FIGS. 6A and 6B, and the process (or transform) that defines this relationship, makes it possible to determine the celestial coordinates of the stars 601 depicted in plate 110, and therefore the center of the field of view represented by plate 110. Specifically, the coordinates can be generated by knowledge of the transform that defines the mechanism by which the captured image's star positions in pixels are related to the stars' celestial positions in right ascension and declination.

In one embodiment, the relationship between plate 110 and celestial coordinates from star database 107 is defined in terms of an affine transformation that is determined by solving linear algebraic terms equations of the form:

$$x = x_0 + \alpha u + \beta v \quad \text{(Eq. 1); and}$$

$$y = y_0 + \chi u + \delta v \quad \text{(Eq. 2)}$$

These equations define, in general terms, a translation of the pixel coordinates (x,y) of the plate image to right ascension and declination coordinates (u,v) of the stars in star database 107, wherein $\alpha$, $\beta$, $\gamma$, and $\delta$ are the coefficients of the transform. The equations, when solved, define a geometric relationship (or transform) in terms of scale, rotation, translation, skew and/or stretch. Knowledge of this relationship allows the position of the center of plate 110 in a celestial coordinate system to be ascertained.

Referring now to FIGS. 7A through 7F, there are shown several examples of such geometric relationships. In each case, plate 110 is transformed into transformed plate 110', which can then be mapped against data from star database 107 as part of the process of determining the position of plate 110 in a celestial coordinate system.

Figure 7A:
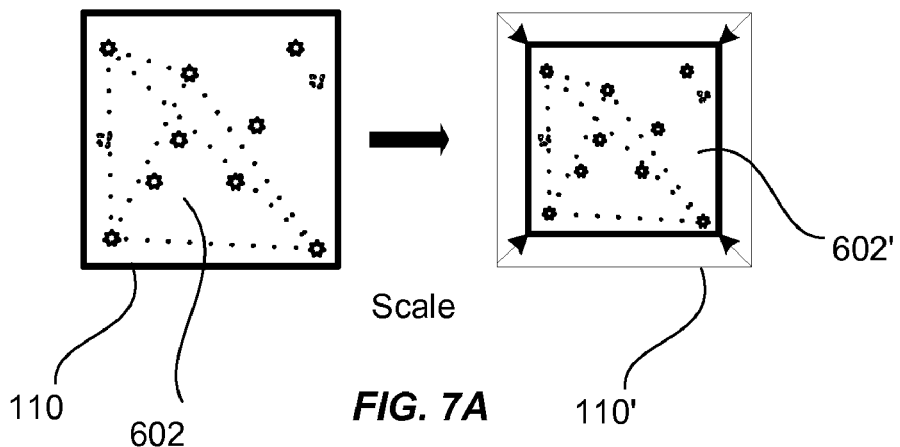
FIGS. 7A through 7F depict various types of geometric transformations establishing relationships between test quads expressed in (x,y) pixel coordinates and corresponding star fields expressed in celestial right ascension and declination units.

FIG. 7A depicts a scale transformation, in which plate 110 is transformed by changing its size.

Figure 7B:
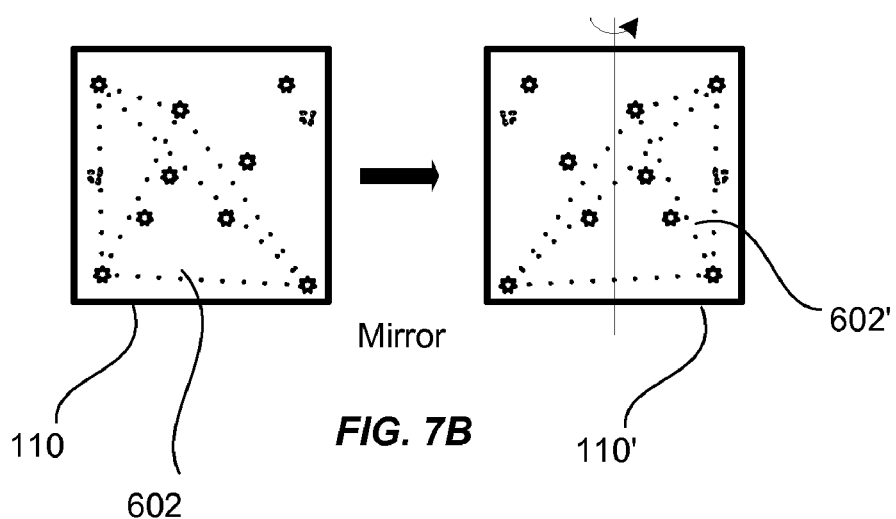

FIG. 7B depicts a mirror transformation, in which a mirror image of plate 110 is generated along a defined axis.

Figure 7C:
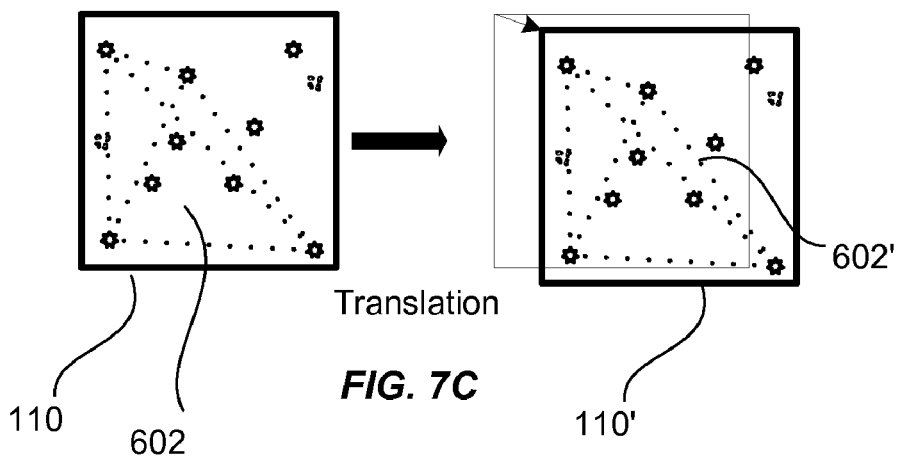

FIG. 7C depicts a translation transformation, in which all points in plate 110 are shifted by the same amount and in the same direction.

Figure 7D:
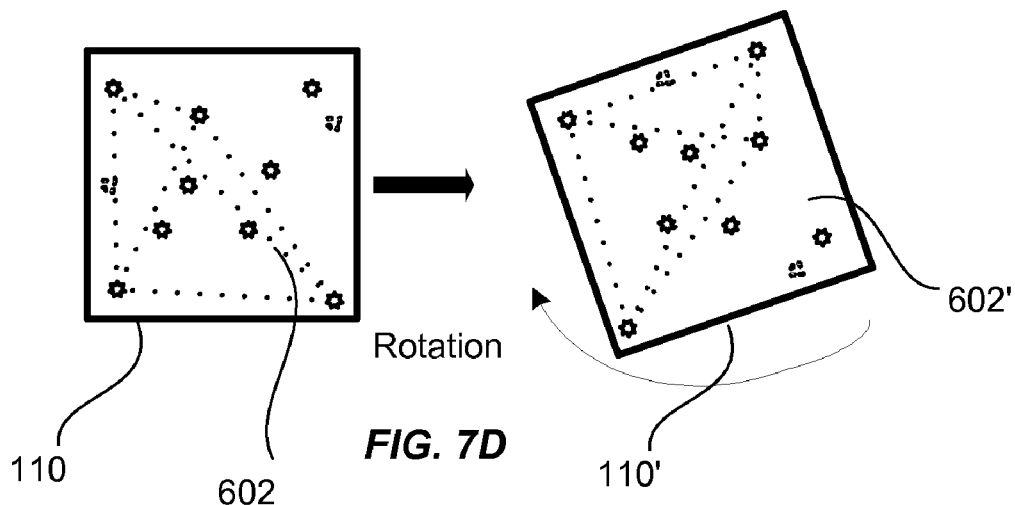

FIG. 7D depicts a rotation transformation, in which plate 110 is rotated.

Figure 7E:
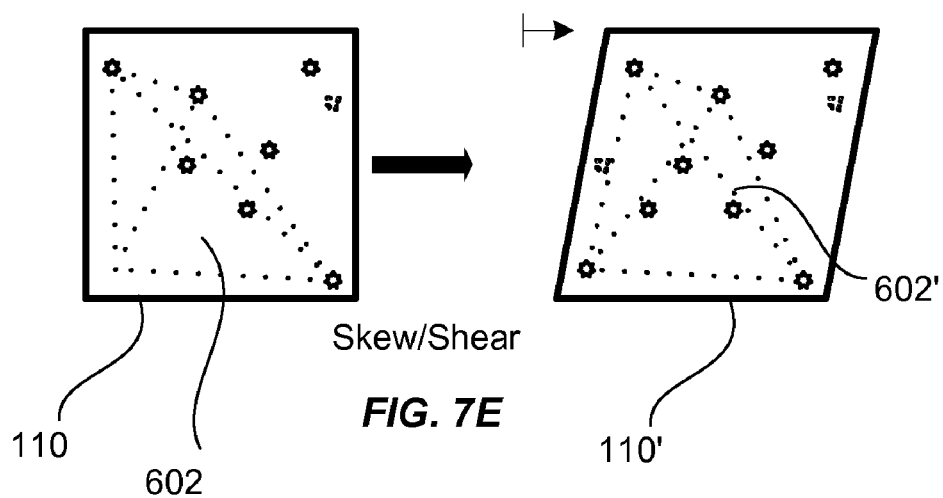

FIG. 7E depicts a skew/shear transformation, in which all points on one axis of plate 110 are left unchanged, and other points of plate 110 are shifted parallel to the axis by a distance proportional to their perpendicular distance from the axis.

Figure 7F:
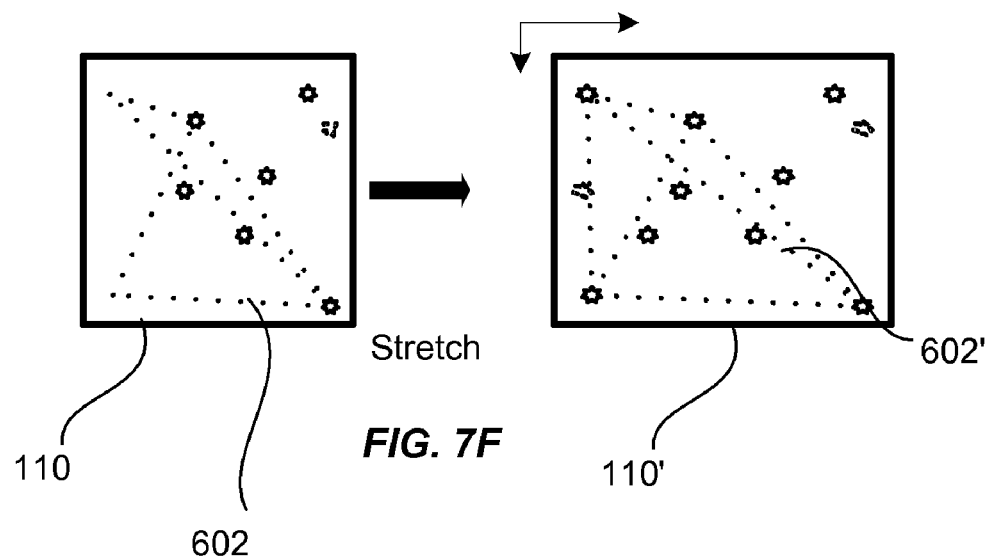

FIG. 7F depicts a stretch transformation, in which points of plate 110 are shifted along one axis only, by an amount proportional to their distance from the other axis.

One skilled in the art will recognize that the transformations shown in FIGS. 7A through 7F are merely exemplary, and that many other transformations can be performed.

Method of Operation

Figure 3A:
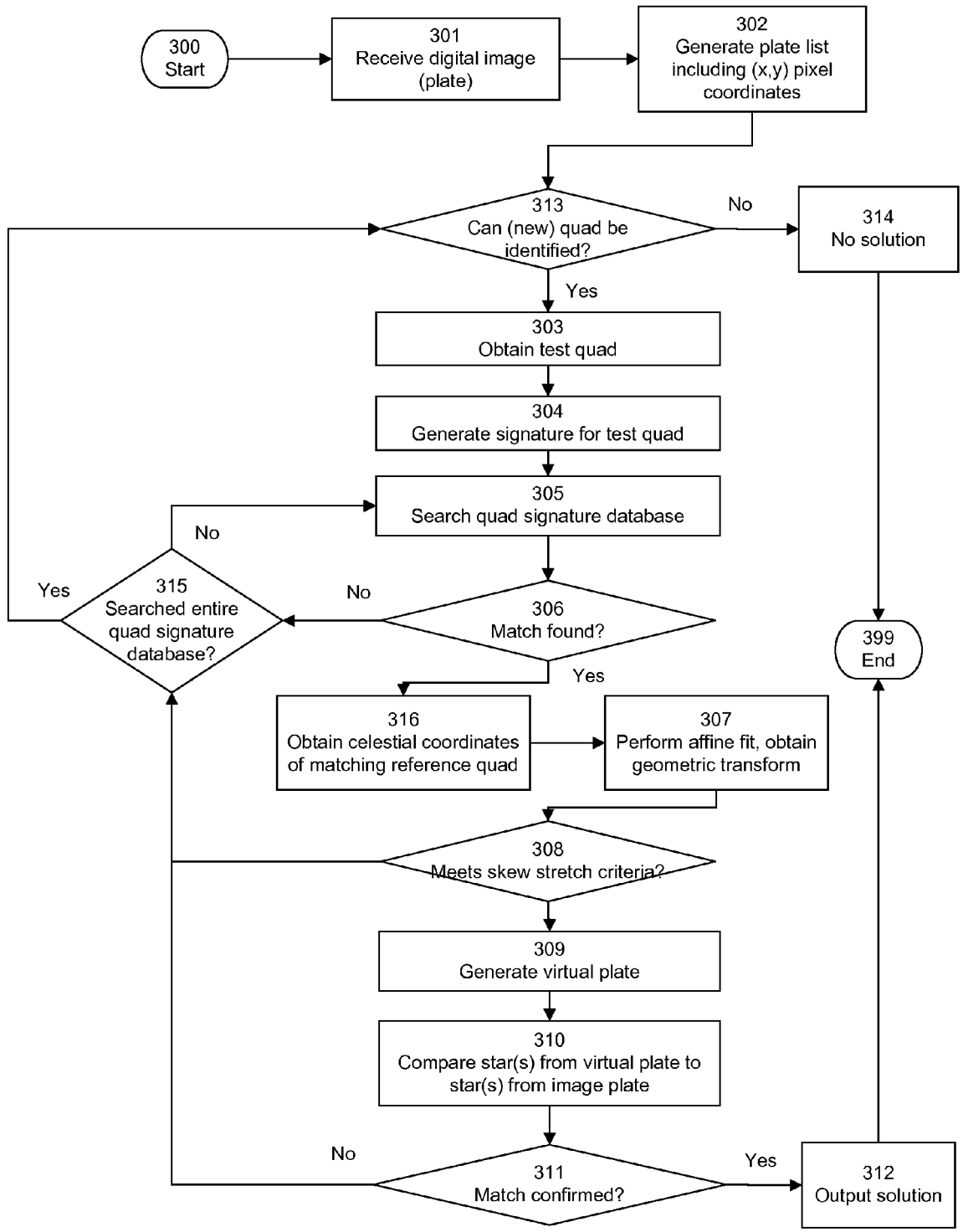
FIG. 3A is a flow diagram depicting a method for practicing the present invention according to one embodiment of the present invention.

Referring now also to FIG. 3A, there is shown a flow diagram depicting a method for practicing the present invention according to one embodiment of the present invention. The method of FIG. 3A will be described in connection with the conceptual architecture depicted in FIG. 4, and further in connection with the hardware architectures depicted in FIGS. 1 and 2. However, one skilled in the art will recognize that the method can be performed in connection with other architectures without departing from the essential characteristics of the present invention. For example, the method of FIG. 3A can be implemented within a stand-alone telescope 109 having functionality for automatically determining celestial coordinates of an image according to the techniques described herein.

Telescope 109 provides digital image, or plate 110, to plate list generator 401, which may be implemented, for example, as a software module running on processor 104 or as an integrated component of telescope 109. Plate list generator 401 receives 301 plate 110 and generates 302 plate list 330 by extracting the positions of celestial objects, such as stars, from plate 110. In one embodiment, plate list 330 is provided in terms of a set of (x,y) pixel coordinates expressed in terms of origin point 612 of plate 110.

In one embodiment, plate list generator 401 is optimized to maximize the number of potential stars extracted. However, in the event some stars are inadvertently omitted, or in the event some "false stars" are incorrectly included due to processing artifacts, or image capture errors, and the like, such errors will be handled according to the techniques of the present invention and will not generally have a significant deleterious effect on the reliability of the system.

According to the techniques of the present invention, a determination is made 313 as to whether a "test quad" 602, or group of four stars 601, can generated from plate list 330. If not, then no solution is available 314, and the method ends 399. As mentioned above, the term "quad" is merely used herein for ease of nomenclature, and is not intended to limit the scope of the claimed invention to embodiments wherein groups of four stars 601 are used; in fact, the claimed invention can be implemented using groups having other quantities of stars 601.

Figure 3B:
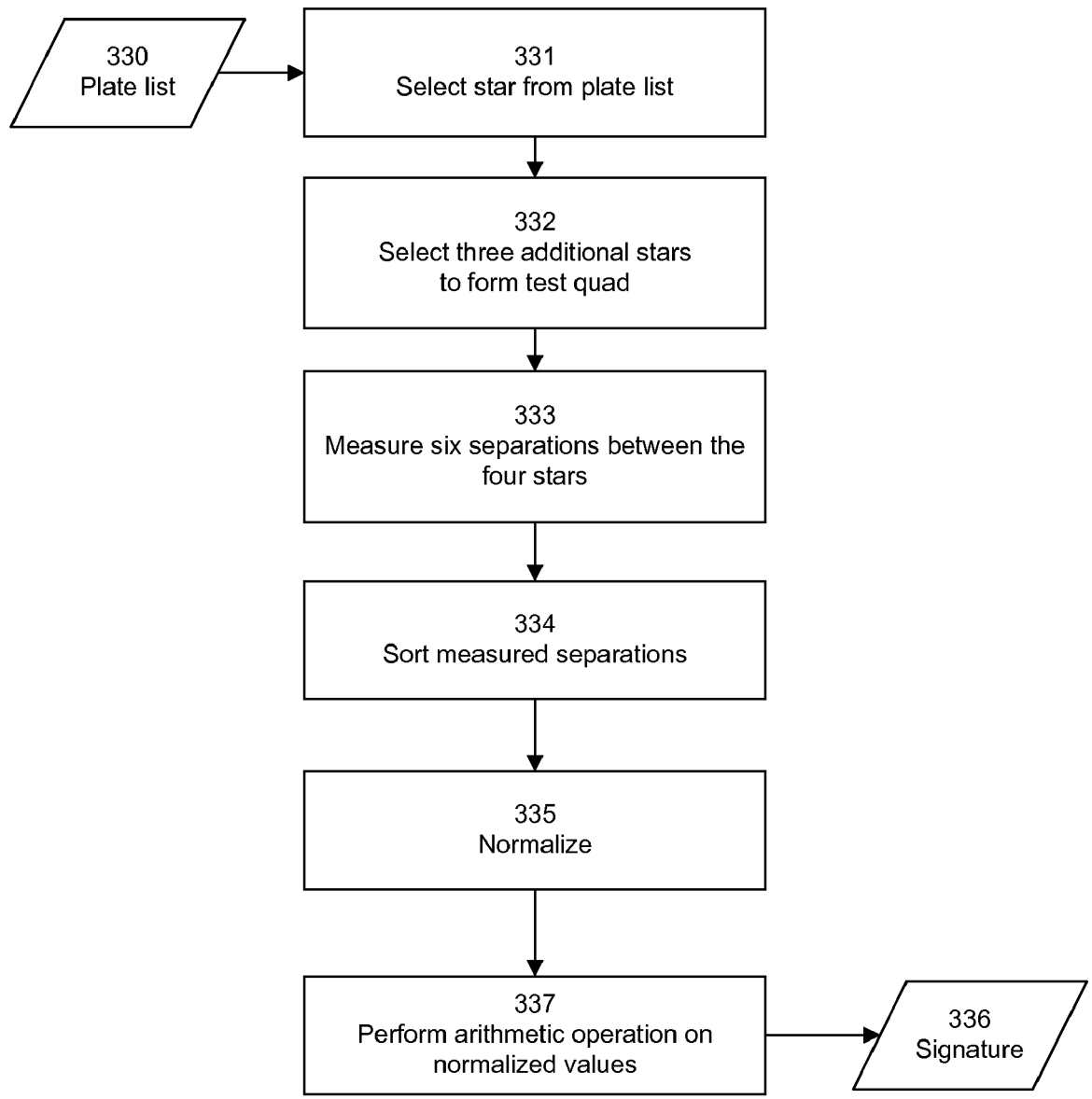
FIG. 3B is a flow diagram depicting a method for generating a signature for a quad, according to one embodiment of the present invention.

If a test quad 602 can be identified, signature generator 402, which may be implemented, for example, as a software module and/or as a component of telescope 109, obtains 303 a test quad 602 and generates 304 a signature 336 for test quad 602. Referring now also to FIG. 3B, there are shown additional details concerning the steps involved in obtaining a test quad 603 and generating a signature 336.

In one embodiment, signature generator selects 331 a star 601 from plate list 330, and then selects 332 three additional stars 601 to form test quad 602 having an optimal group of four stars 601. In one embodiment, wherein the stars 601 are selected 332 so to maximize the distances between them. Distances between the selected stars 601 are measured 333 and sorted 334.

Figure 6C:
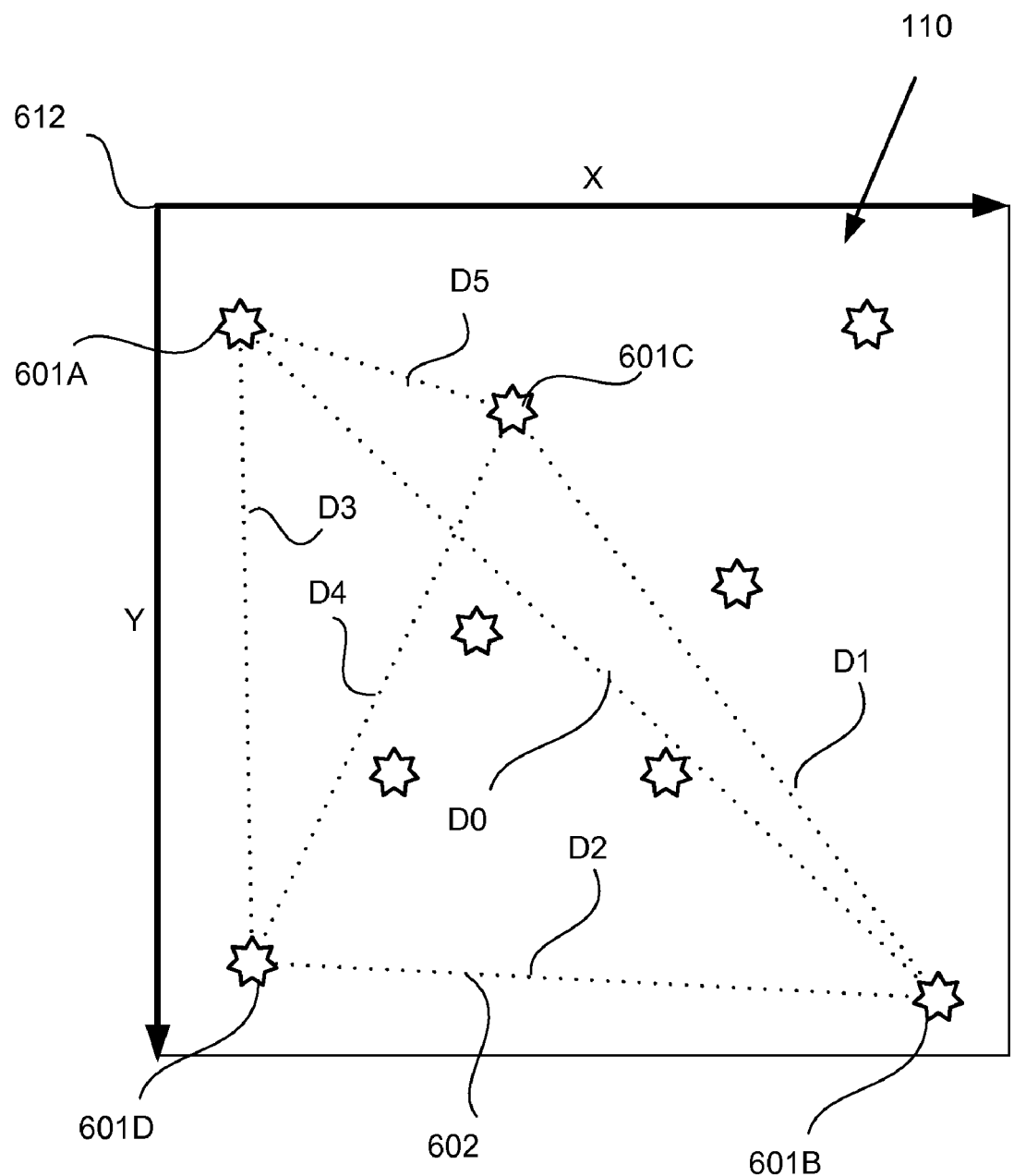
FIG. 6C depicts the plate of FIG. 6A, including labeled segments to identify separations among stars in the test quad, according to one embodiment.

Referring now also to FIG. 6C, there is shown the plate of FIG. 6A, including labeled segments D0 through D5 to identify separations, among stars in test quad 602. Each segment D0 through D5 joins a star 601 in test quad 602 to one of the other stars 601 in test quad 602. In one embodiment, segments D0 through D5 are sorted 334, from longest D0 to shortest D5, although one skilled in the art will recognize that any other arrangement for sorting segments D0 through D5 can be used. In the example of FIG. 6C, star 601A is the first star in plate list 330, and stars 601B, 601C, and 601D are chosen to have a degree of separation from star 601A and other stars in plate 110.

Signature generator 402 generates 304 a signature 336 for the test quad. In one embodiment, signature 336 is generated 304 by normalizing 335 the measured separations and performing 337 an arithmetic operation to combine the normalized values. Normalization ensures that signature 336 is independent of the scale of the image represented by plate 110. This creates an indexable metric that allows for quick and definitive searches, and simplifies the matching operation. Additionally, normalization allows comparisons that are independent of image scale and rotation.

In one embodiment, normalization 335 is performed by dividing the five shorter separations D1 through D5 by D0, which is the largest separation.

In one embodiment, an arithmetic operation is performed 337 to generate signature 336, for example by determining the sum of the five normalized separations D1 through D5. The signature 336 is define as a set of size values: each of the five normalized separations, along with the sum of the five normalized separations, as follows:

$$\left(\frac{D_1}{D_0}\right), \left(\frac{D_2}{D_0}\right), \left(\frac{D_3}{D_0}\right), \left(\frac{D_4}{D_0}\right), \left(\frac{D_5}{D_0}\right), \left(\frac{D_1}{D_0} + \frac{D_2}{D_0} + \frac{D_3}{D_0} + \frac{D_4}{D_0} + \frac{D_5}{D_0}\right).$$

This signature 336 can then be used as a query term for searching through database 407 of reference signatures 336. In one embodiment, for example, a match is identified when the six values match the six values of a reference signature 336. In one embodiment, a tolerance range is specified; matches are identified when the values are within the tolerance range of reference signature 336 values.

In one embodiment, reference signatures 336 within signature database 407 are generated in the same way as described above for test quad 602. Thus, signature database 407 contains signatures 336 for any number of quads 602 corresponding to groups of stars 601 found throughout the sky. In one embodiment, signature database 407 can be localized to particular geographic regions (for example, if desired, signature database 407 can be localized to northern or southern hemisphere, or it can include both hemispheres). In one embodiment, reference signatures 336 are generated from quads 602 taken from a catalogue of stars, such as for example from star database 107. In one embodiment, records within signature database 407 can include index pointers to individual stars within star database 107, so as to facilitate access to information concerning the star(s) represented by a particular reference signature 336, including for example celestial coordinates and/or other information.

In one embodiment, quads 602 in the signature database 407 are sorted by the sum component of their signature, so as to allow signature database 407 to be quickly searched. In the same way that a search for a word in a dictionary starts with the first letter of the word, the search for a reference signature 336 in the signature database 407 starts with this sum component of test quad 602.

Once signature 336 has been generated 304 for test quad 602, search module 403, which may be implemented as a software module, searches 305 quad signature database 407 using test quad signature 336. As described above, in one embodiment, a match is determined when the six values of test quad signature 336 match the six values of a reference signature 336 in quad signature database 407, within a specified tolerance. In other embodiments, other matching criteria can be applied, such as for example more (or less) stringent criteria.

Signature comparison module 404, which may be implemented as a software module, determines 306 whether a match 411 has been found. If no match 411 is found, search module 403 determines 315 whether it has searched the entire quad signature database 407. If not, search module 403 returns to step 305 to continue the search. If the entire quad signature database 407 has been searched, the method returns to step 313 to determine whether a new test quad 602 can be generated from plate 110.

If, in step 306, it is determined that a match 411 (i.e. a matching reference signature 336 corresponding to a reference quad 602) has been found, having all the characteristics of test quad signature 336, the celestial coordinates of the matching reference quad 602 are obtained 316 (based on information from signature database 407 and/or star database 107). Transform generator 405, which may be implemented as a software module, performs an affine fit operation 307 to generate a geometric transform 406 representing the relationship between test quad 602 and matching reference quad 602. Geometric transform 406 represents the geometric operation that would be performed on test quad 602 to align it with matching reference quad 602. Knowledge of the celestial coordinates of the match 411 along with this geometric transform 406 yields the celestial coordinates of plate 110. However, in one embodiment, these celestial coordinates are considered tentative until further verification is performed.

In one embodiment, additional steps are performed to verify identification of test quad 602. The scale and rotation-free characteristics of each quad 602, along with the large number of reference signatures 336 in signature database 407, can create a reasonable probability of a false match. Therefore, in one embodiment, additional steps 308 through 311 are performed to verify the match.

In one embodiment, the match is verified by measuring skew and stretch values of the geometric transform 406 that specifies the relationship between test quad 602 and reference quad 602. In general, an imaging system that is used to capture plate image 110 should yield a skew value close to 0 and a stretch value close to 1. That is, the imaging x and y axis should always be substantially orthogonal, and (assuming square pixels) the x and y scale should be substantially the same. If the imaging system has non-square pixels, plate image 110 can be transformed to square pixels according to well-known techniques for image processing.

In one embodiment, the skew and stretch values of the transformed test quad 602 are evaluated against those of the reference quad 602 in order to determine 308 whether the skew and stretch criteria are met (within some predefined tolerance value). If the criteria are not met, the match is rejected, and the method returns to step 315.

In one embodiment, further verification is performed by checking for additional stars 601 that should be expected at certain locations within plate 110. Virtual plate generator 408, which may be implemented as a software module, generates 309 a "virtual plate" 409 centered on the matched quad 602, using determined geometric transform 406. In one embodiment, this step is performed by taking the tentative determined celestial coordinates of plate 110, and, using data from star database 107, filling in the location of one or more additional stars 601 that would be expected to appear within the field of view of plate 110 based on these tentative determined celestial coordinates; this forms virtual plate 409. These additional stars 601 are then compared 310 against stars 601 observed on original plate 110, to determine 311 whether match 411 should be confirmed or rejected. If at least one additional star 601 from the plate 110 is found at a location corresponding to that of a star location on virtual plate 409 (or at a location within a tolerance range of the star location on virtual plate 409), then the match 411 is confirmed. The tentative determined celestial coordinates of plate 110 are then considered confirmed celestial coordinates, a solution is output 312, and the method ends 399. The output can include, for example, an indication of celestial coordinates corresponding to plate 110 (for example, the celestial coordinates of the center of plate 110 and/or celestial coordinates corresponding to plate coordinates derived from plate 110), based on the celestial position of the matching reference quad 602. The output can further include additional information, such as details of the transform 406 that defines the relationship between test quad 602 and the matching reference quad 602.

In one embodiment, some degree of positioning error is allowed for, expressed for example as a tolerance range.

If no matching star 601 is found, the match 411 is rejected, and the method returns to step 315. In various embodiments, any number of such matching stars 601 can be sought.

Thus, according to the techniques of the present invention, a test quad 602 from plate 110 is matched to a reference quad 602, and then the match is confirmed by matching additional star(s) 601 found on plate 110 against stars 601 in database 107. Once the match is confirmed, the celestial position represented by plate 110 is determined based on the relationship (represented as geometric transform 406) between test quad 602 and reference quad 602. In one embodiment, this process is performed iteratively, to improve reliability and robustness of the position determination. Transform 406 can also be used to determine the precise celestial coordinates of any stars 601 appearing within plate 110.

Figure 6D:
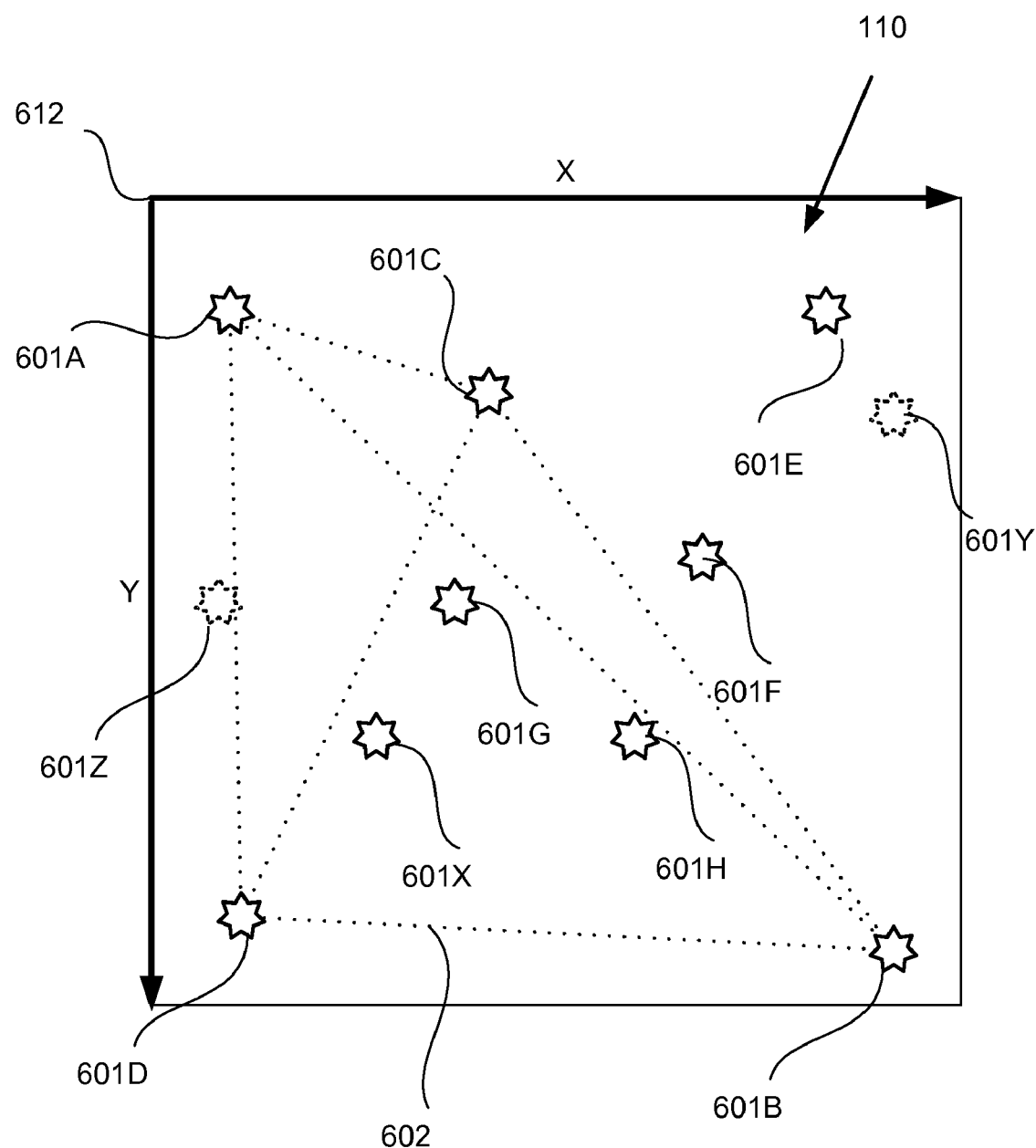
FIG. 6D depicts the plate of FIG. 6A, including errors for illustrative purposes, according to one embodiment.

The techniques of the present invention are capable of generating reliable results even in the presence of false and/or missing stars in plate 110 that may result from artifacts and/or errors in the imaging process. Referring now to FIG. 6D, there is shown an example of plate 110, substantially similar to the plate of FIG. 6A, but including some errors for illustrative purposes. False star 601X appears to be a star, but is actually an error; its appearance in plate 110 may be caused an artifact of the imaging process, or an asteroid, or some other cause. Stars 601Y, 601Z are missing from plate 110, but are indicated as dotted outlines in FIG. 6D to depict the locations where such stars would appear in plate 110 if they were properly captured. For example, stars 601Y, 601Z may have been too dim to be properly captured, or may have been obscured by atmospheric conditions at the time of image capture.

Figure 6E:
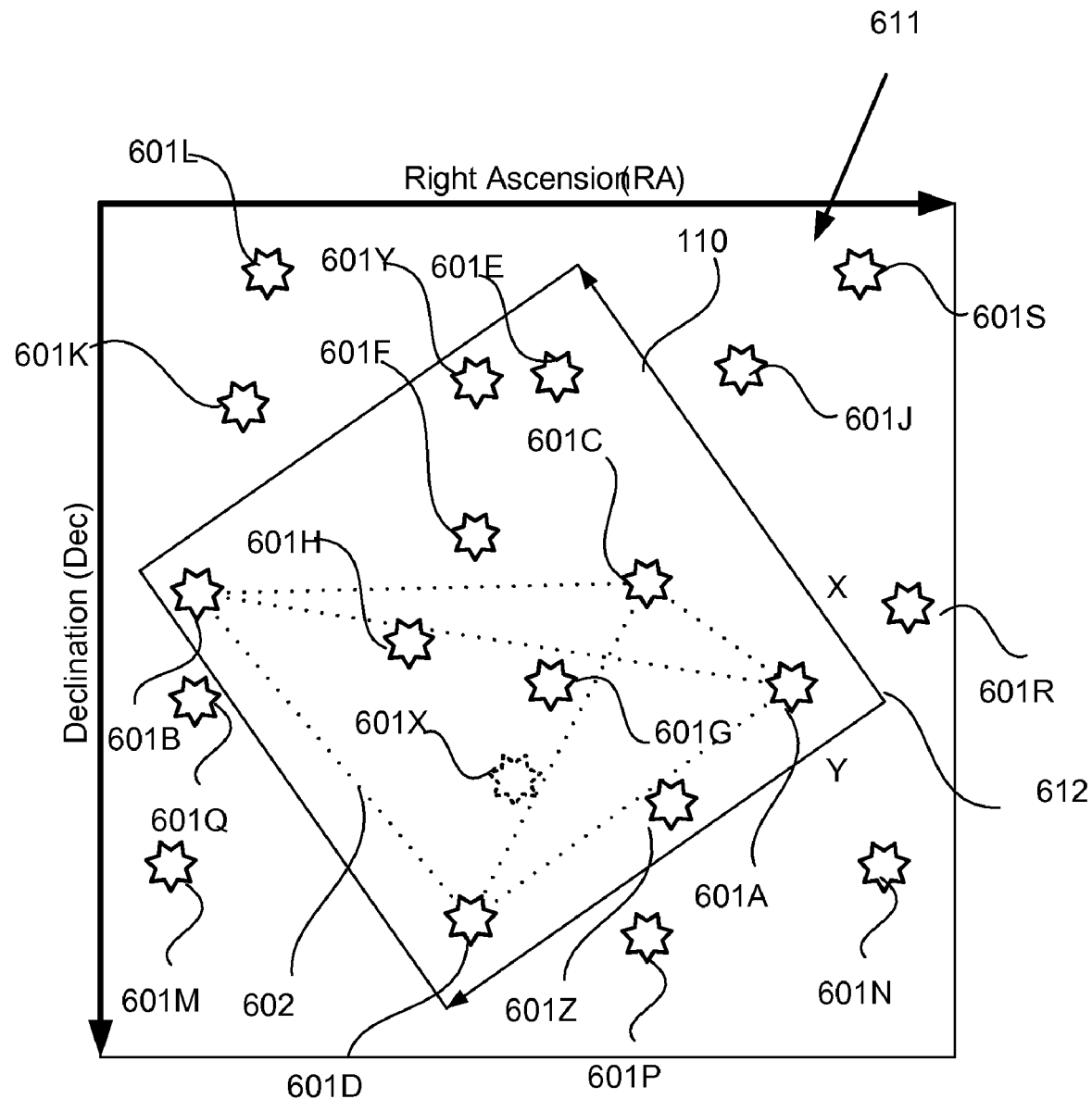
FIG. 6E depicts a representation of the plate of FIG. 6D, shown in the context of a virtual star field, according to one embodiment.

FIG. 6E depicts a representation of plate 110 of FIG. 6D, shown in the context of a virtual star field 611, according to one embodiment. Actual celestial locations of stars 601Y, 601Z are shown. The location of false star 601X is indicated in FIG. 6D by a dotted outline, although false star 601X is not actually found in the virtual star field 611.

According to the techniques of the present invention, such imaging errors and artifacts do not adversely affect the determination of celestial coordinates of plate 110, as long as there are enough valid stars 601 from the plate 110 to form a test quad 602, and as long as the signature database 407 contains a sufficient number of signatures 336 corresponding to stars 601 for the given field of view associated with plate 110. The large number of potential matches among signatures 336 ensures that, in most cases, match will eventually be made, so as to accurately indicate celestial coordinates of plate 110.

User Interface

In one embodiment wherein the system of the present invention is implemented on a computing device or other electronic device, user 130 interacts with the system of the present invention via a user interface, which may be implemented in software running on processor 104. User 130 provides input via input device 102 (such as a keyboard, pointing device, and/or touchscreen) and views results on output device 103 (such as a screen).

Figure 5:
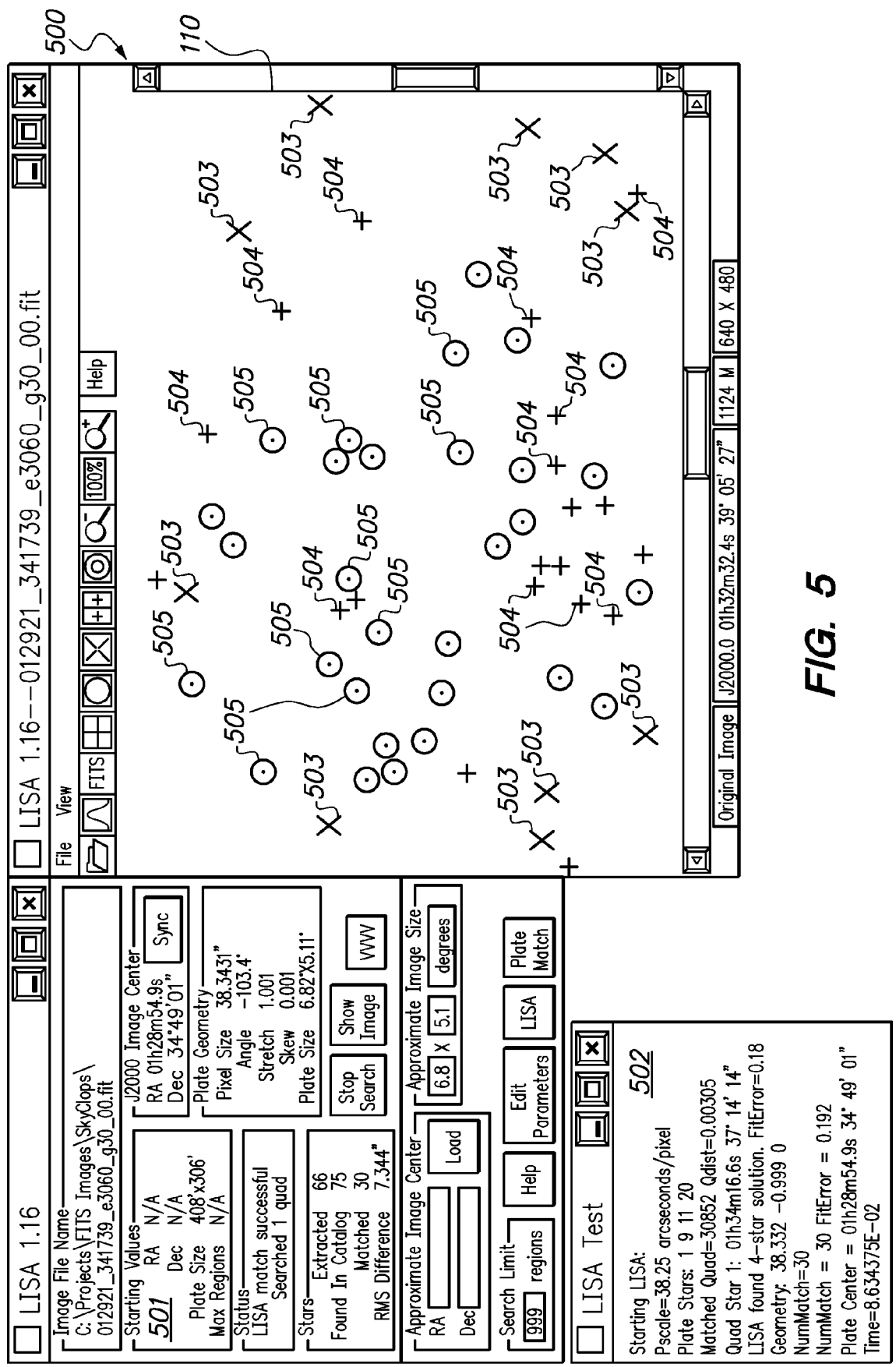
FIG. 5 is a screen shot depicting an example of a user interface for displaying results of the plate solving method of the present invention according to one embodiment.

Referring now to FIG. 5, there is shown a screen shot depicting an example of a user interface 500 for displaying results of the plate solving method of the present invention according to one embodiment wherein the system of the present invention is implemented on a personal computer. One skilled in the art will recognize that the particular arrangement of elements in the example of FIG. 5 is merely exemplary, and that many other arrangements of such elements, and/or of other elements, can be provided without departing from the essential characteristics of the present invention.

In the example of FIG. 5, plate 110 is shown, corresponding to a digital file stored on storage device 106. Plate 110 represents an image that has been captured, for example using a CCD camera or other image capture device mounted on telescope 109. "X" symbols 503 indicate stars from star database 107 overlaid on plate 110. "+" symbols 504 indicate stars extracted from plate 110. "O" symbols 505 indicate matches between stars from star database 107 and stars extracted from plate 110. In one embodiment, these symbols are color-coded; for example, "X" symbols 503 can be indicated in blue, "+" symbols 504 can be indicated in red, and "O" symbols 505 can be indicated in yellow. One skilled in the art will recognize that any symbols and/or colors can be used.

Window 501 includes information about plate 110, including plate size, image file name, number of stars extracted, found, and matched, plate geometry, the like. It also shows information about the stars that were extracted. Buttons are provided in window 501 for controlling various operations of the software. Window 502 shows the results of a plate solving operation, including identification of the test and match quads 602, determined plate center coordinates, fit error, scale, and other data. Such results can be presented in any format, including for example text format, graphical format, or the like. Results can also be stored and/or trans-mitted using any known network protocols, as desired or appropriate. In various embodiments, different types of output and user interfaces can be provided in connection with the present invention. For example, in some embodiments, the system of the present invention generates output that is used for aligning a telescope, as described in the above-cited related patent application. In yet other embodiments, output generated by the system of the present invention can be the right ascension and declination corresponding to the center of image plate 110.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a nontransitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, applicahon specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a telescope, mobile phone, personal digital assistant, smartphone, kiosk, desktop computer, laptop computer, tablet computer, consumer electronic device, television, set-top box, or the like. An electronic device for implementing the present invention may use any operating system such as, for example, Microsoft Windows available from Microsoft Corporation of Redmond, Wash., MacOS available from Apple Inc. of Cupertino, Calif., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for determining celestial coordinates corresponding to an image, comprising:
   receiving an image comprising a plurality of depicted objects;
   generating, at a processor, a list of initial coordinates indicating positions, with respect to an origin point for the image, of a plurality of depicted objects in the image;
   selecting, at the processor, a group of objects from the plurality of depicted objects;
   generating, at the processor, a test signature based on the initial coordinates of the objects in the selected group;
   searching a data store for at least one reference signature that matches the generated test signature within a specified tolerance;
   for at least one reference signature that matches the generated test signature within a specified tolerance:
      obtaining a celestial position corresponding to the reference signature;
      determining, from the obtained celestial position corresponding to the reference signature, celestial coordinates for the image; and
      outputting the determined celestial coordinates at an output device;
   wherein searching a data store for at least one reference signature that matches the generated test signature within a specified tolerance comprises:
   for at least a plurality of reference signatures in the data store, performing an affine fit operation to generate a geometric transform representing the relationship between the generated test signature and the reference signature; and
   identifying at least one reference signature for which the generated geometric transform indicates that the reference signature matches the generated test signature within a specified tolerance.

2. The method of claim 1, wherein the image comprises at least one selected from the group consisting of:
   a digital image received via a network connection;
   a digital image obtained from a storage device;
   a digital image obtained from an optical sensing device;
   an image received from a telescope; and
   a photographic image.

3. The method of claim 1, wherein the depicted objects comprise representations of celestial objects.

4. The method of claim 1, wherein the depicted objects comprise representations of stars.

5. The method of claim 1, wherein the initial coordinates comprise pixel-based locations of depicted objects.

6. The method of claim 1, wherein selecting a group of objects comprises selecting a group of four objects.

7. The method of claim 1, wherein generating a test signature comprises generating a test signature based on separation among pairs of depicted objects in the selected group.

8. The method of claim 1, wherein generating a test signature comprises generating a test signature comprising normalized representations of separation among pairs of depicted objects in the selected group.

9. The method of claim 1, wherein generating a test signature comprises:
   for each pair of depicted objects in the selected group, determining a separation between the depicted objects;
   sorting the determined separations;
   normalizing the determined separations with respect to the largest determined separation; and
   assembling a signature comprising the normalized separations.

10. The method of claim 1, wherein each reference signature in the data store corresponds to a group of celestial objects.

11. The method of claim 1, further comprising, prior to outputting the determined celestial coordinates, verifying a match between the generated test signature and a reference signature that matches the generated test signature within a specified tolerance.

12. The method of claim 11, wherein verifying a match between the generated test signature and a reference signature that matches the generated test signature within a specified tolerance comprises:
   determining at least one of a skew criterion and a stretch criterion for the generated test signature with respect to the reference signature;
   determining whether the determined at least one of a skew criterion and a stretch criterion falls within a predefined tolerance for verifying a match.

13. The method of claim 11, wherein verifying a match between the generated test signature and a reference signature that matches the generated test signature within a specified tolerance comprises:
   determining a transform defining a relationship between the group of objects corresponding to the test signature and a group of celestial objects corresponding to the reference signature;
   obtaining, from a data store, a position of an additional celestial object;
   applying the transform to the obtained position of the additional celestial object to obtain an expected position of the additional celestial object within the image;
   determining whether a depiction of the additional celestial object appears within the image at a position within a tolerance range of the expected position.

14. The method of claim 11, further comprising, responsive to a failure to verify the match, repeating the steps of selecting a group of objects, generating a test signature, searching a data store for a reference signature that matches the generated test signature within a specified tolerance, and verifying the match.

15. The method of claim 1, wherein:
   the reference signature that matches the generated test signature within a specified tolerance corresponds to a group of celestial objects; and
   the obtained celestial position corresponding to the reference signature comprises a celestial position for the group of celestial objects;
   and wherein determining, from the obtained celestial position corresponding to the reference signature, celestial coordinates for the image, comprises determining a transform defining a relationship between the group of objects corresponding to the test signature and the group of celestial objects.

16. The method of claim 1, wherein receiving an image comprises receiving an image free of information describing the celestial position of the image.

17. The method of claim 1, wherein outputting the determined celestial coordinates at an output device comprises outputting the determined celestial coordinates in terms of right ascension and declination.

18. A computer-implemented method for determining celestial coordinates corresponding to an image, comprising:
 receiving an image comprising a plurality of depicted objects;
 generating, at a processor, a list of initial coordinates indicating positions, with respect to an origin point for the image, of a plurality of depicted objects in the image;
 selecting, at the processor, a group of objects from the plurality of depicted objects;
 generating, at the processor, a test signature based on the initial coordinates of the objects in the selected group;
 searching a data store for at least one reference signature that matches the generated test signature within a specified tolerance;
 for at least one reference signature that matches the generated test signature within a specified tolerance:
  obtaining a celestial position corresponding to the reference signature;
  determining, from the obtained celestial position corresponding to the reference signature, celestial coordinates for the image; and
  outputting the determined celestial coordinates at an output device
 wherein generating a test signature comprises:
 for each pair of depicted objects in the selected group, determining a separation between the depicted objects;
 sorting the determined separations;
 normalizing the determined separations with respect to the largest determined separation; and
 assembling a signature comprising the normalized separations and the sum of the normalized signatures.

19. A system for determining celestial coordinates corresponding to an image, comprising:
 an image capture device, configured to capture an image comprising a plurality of depicted objects;
 a plate list generator, configured to generate a list of initial coordinates indicating positions, with respect to an origin point for the image, of a plurality of depicted objects in the image;
 a signature generator, configured to select a group of objects from the plurality of depicted objects and for generating a test signature based on the initial coordinates of the objects in the selected group;
 a search module, configured to search a data store for at least one reference signature that matches the generated test signature within a specified tolerance;
 a processor, configured to, for at least one reference signature that matches the generated test signature within a specified tolerance:
  obtain a celestial position corresponding to the reference signature; and
  determine, from the obtained celestial position corresponding to the reference signature, celestial coordinates for the image; and
 an output device, configured to output the determined celestial coordinates;
 wherein the search module is configured to search a data store for at least one reference signature that matches the generated test signature within a specified tolerance by:
 for at least a plurality of reference signatures in the data store, performing an affine fit operation to generate a geometric transform representing the relationship between the generated test signature and the reference signature; and
 identifying at least one reference signature for which the generated geometric transform indicates that the reference signature matches the generated test signature within a specified tolerance.

20. The system of claim 19, wherein the image comprises at least one selected from the group consisting of:
 a digital image received via a network connection;
 a digital image obtained from a storage device;
 a digital image obtained from an optical sensing device;
 an image received from a telescope; and
 a photographic image.

21. The system of claim 19, wherein the depicted objects comprise representations of celestial objects.

22. The system of claim 19, wherein the initial coordinates comprise pixel-based locations of depicted objects.

23. The system of claim 19, wherein the signature generator is configured to select a group of four objects.

24. The system of claim 19, wherein the signature generator is configured to generate the test signature based on separation among pairs of depicted objects in the selected group.

25. The system of claim 19, wherein the signature generator is configured to generate a test signature by:
 for each pair of depicted objects in the selected group, determining a separation between the depicted objects;
 sorting the determined separations;
 normalizing the determined separations with respect to the largest determined separation; and
 assembling a signature comprising the normalized separations.

26. The system of claim 19, wherein each reference signature in the data store corresponds to a group of celestial objects.

27. The system of claim 19, wherein the processor is configured to verify a match between the generated test signature and a reference signature that matches the generated test signature within a specified tolerance.

28. The system of claim 27, wherein the processor is configured to verify a match between the generated test signature and a reference signature that matches the generated test signature within a specified tolerance by:
 determining at least one of a skew criterion and a stretch criterion for the generated test signature with respect to the reference signature;
 determining whether the determined at least one of a skew criterion and a stretch criterion falls within a predefined tolerance for verifying a match.

29. The system of claim 27, wherein the processor is configured to verify a match between the generated test signature and a reference signature that matches the generated test signature within a specified tolerance by:
 determining a transform defining a relationship between the group of objects corresponding to the test signature and a group of celestial objects corresponding to the reference signature;
 obtaining, from a data store, a position of an additional celestial object;
 applying the transform to the obtained position of the additional celestial object to obtain an expected position of the additional celestial object within the image;
 determining whether a depiction of the additional celestial object appears within the image at a position within a tolerance range of the expected position.

30. The system of claim 27, wherein, responsive to a failure to verify the match, the signature generator is configured to repeat the step of selecting a group of objects and generating a test signature, and the search module is configured to repeat the step of searching a data store for a reference signature that matches the generated test signature within a specified tolerance, and the processor is configured to repeat the step of verifying the match.

31. The system of claim 19, wherein:
the reference signature that matches the generated test signature within a specified tolerance corresponds to a group of celestial objects; and
the obtained celestial position corresponding to the reference signature comprises a celestial position for the group of celestial objects;
and wherein the processor is configured to determine celestial coordinates for the image by determining a transform defining a relationship between the group of objects corresponding to the test signature and the group of celestial objects.

32. The system of claim 19, wherein the captured image is free of information describing the celestial position of the image.

33. The system of claim 19, wherein the output device is configured to output the determined celestial coordinates by outputting the determined celestial coordinates in terms of right ascension and declination.

34. A system for determining celestial coordinates corresponding to an image, comprising:
an image capture device, configured to capture an image comprising a plurality of depicted objects;
a plate list generator, configured to generate a list of initial coordinates indicating positions, with respect to an origin point for the image, of a plurality of depicted objects in the image;
a signature generator, configured to select a group of objects from the plurality of depicted objects and for generating a test signature based on the initial coordinates of the objects in the selected group;
a search module, configured to search a data store for at least one reference signature that matches the generated test signature within a specified tolerance;
a processor, configured to, for at least one reference signature that matches the generated test signature within a specified tolerance:
obtain a celestial position corresponding to the reference signature; and
determine, from the obtained celestial position corresponding to the reference signature, celestial coordinates for the image; and
an output device, configured to output the determined celestial coordinates;
wherein the signature generator is configured to generate a test signature by:
for each pair of depicted objects in the selected group, determining a separation between the depicted objects;
sorting the determined separations;
normalizing the determined separations with respect to the largest determined separation; and
assembling a signature comprising the normalized signatures and the sum of the normalized signatures.

35. A computer program product for determining celestial coordinates corresponding to an image, comprising:
a non-transitory computer-readable storage medium; and
computer program code, encoded on the medium, configured to cause at least one processor to perform the steps of:
receiving an image comprising a plurality of depicted objects;
generating, at a processor, a list of initial coordinates indicating positions, with respect to an origin point for the image, of a plurality of depicted objects in the image;
selecting, at the processor, a group of objects from the plurality of depicted objects;
generating, at the processor, a test signature based on the initial coordinates of the objects in the selected group;
searching a data store for at least one reference signature that matches the generated test signature within a specified tolerance;
for at least one reference signature that matches the generated test signature within a specified tolerance:
obtaining a celestial position corresponding to the reference signature;
determining, from the obtained celestial position corresponding to the reference signature, celestial coordinates for the image; and
outputting the determined celestial coordinates at an output device;
wherein the computer program code configured to cause at least one processor to search a data store for at least one reference signature that matches the generated test signature within a specified tolerance comprises computer program code configured to cause at least one processor to perform the steps of:
for at least a plurality of reference signatures in the data store, performing an affine fit operation to generate a geometric transform representing the relationship between the generated test signature and the reference signature; and
identifying at least one reference signature for which the generated geometric transform indicates that the reference signature matches the generated test signature within a specified tolerance.

\* \* \* \* \*